(12) United States Patent
Watanabe et al.

(10) Patent No.: US 6,665,023 B1
(45) Date of Patent: Dec. 16, 2003

(54) ACTIVE MATRIX LIQUID CRYSTAL DISPLAY DEVICE HAVING PARTICULAR CAPACITANCE PATTERNS

(75) Inventors: Makoto Watanabe, Tokyo (JP); Takahiko Watanabe, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 09/323,492

(22) Filed: Jun. 1, 1999

(30) Foreign Application Priority Data

Jun. 1, 1998 (JP) .......................... 10-151601

(51) Int. Cl.[7] .......................................... G02F 1/1343
(52) U.S. Cl. .................... 349/38; 349/39; 349/141; 349/143
(58) Field of Search ......................... 349/38, 39, 141, 349/143, 54

(56) References Cited

U.S. PATENT DOCUMENTS

| | | | |
|---|---|---|---|
| 5,151,805 A | | 9/1992 | Takeda et al. |
| 5,877,512 A | * | 3/1999 | Kim .............................. 257/57 |
| 6,040,813 A | * | 3/2000 | Takubo ......................... 345/92 |
| 6,069,678 A | * | 5/2000 | Sakamoto et al. ........... 349/141 |
| 6,133,977 A | * | 10/2000 | Lee et al. .................... 349/141 |
| 6,300,926 B1 | * | 10/2001 | Yoneya et al. ................. 345/87 |

FOREIGN PATENT DOCUMENTS

| | | |
|---|---|---|
| EP | 0 206 178 A1 | 2/1986 |
| EP | 0 336 570 A1 | 10/1989 |
| EP | 0 595 792 A2 | 5/1994 |
| JP | 63-21907 | 5/1988 |

* cited by examiner

Primary Examiner—Robert H. Kim
Assistant Examiner—Mike Qi
(74) Attorney, Agent, or Firm—Katten Muchin Zavis Rosenman

(57) ABSTRACT

A liquid crystal display device with improved image quality by reducing emphasized separation line corresponding to a divisional position, vertical faint stripes and lateral crosstalk caused by the displacement of divisional exposure of light in manufacturing a wired substrate of a liquid crystal display panel installed in an IPS liquid crystal display device. Compensating capacity patterns are provided to make parasitic capacities invariable irrespective of positions whether or not it is at the divisional position or the others. It is concerned with capacity between signal wire and its nearest common electrode wire formed on a substrate of a driving element side manufactured through the divisional light-exposing and installed in an active matrix display device. A liquid crystal material is driven by an electric field parallel to the substrate surface.

6 Claims, 14 Drawing Sheets

(a) ADJACENT D LAYERS COME NEAR TO EACH OTHER WHILE A DIVISIONAL POSITION IS POSITIONED ON THEIR CENTER (b) ADJACENT D LAYERS CAME AWAY FROM EACH OTHER WHILE A DIVISIONAL POSITION IS POSITIONED ON THEIR CENTER

FIG. 4

(a) ADJACENT G LAYERS COME NEAR TO EACH OTHER WHILE A DIVISIONAL POSITION IS POSITIONED ON THEIR CENTER

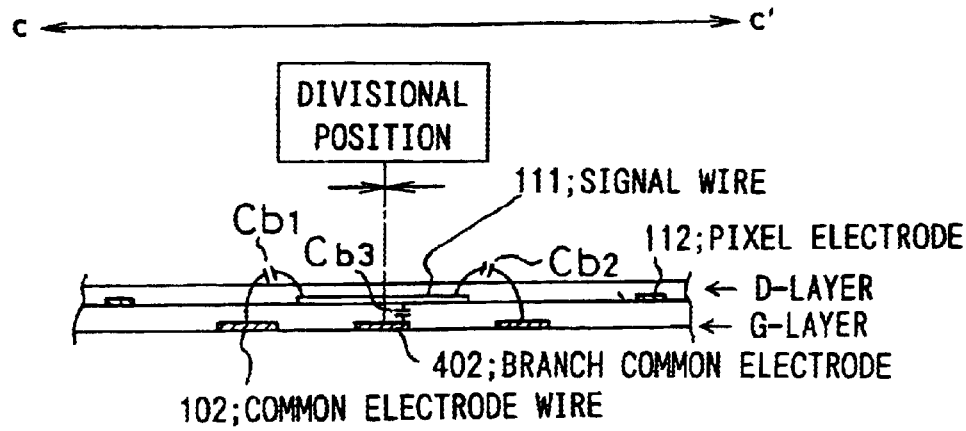

$Cb1, Cb2 \rightarrow$ INCREASE, $Cb0, Cb3 \rightarrow$ DECREASE $\Rightarrow \sum_{c=0}^{3} Cbc =$ CONSTANT

FIG. 4

(b) ADJACENT G LAYERS CAME AWAY FROM EACH OTHER WHILE A DIVISIONAL POSITION IS POSITIONED ON THEIR CENTER

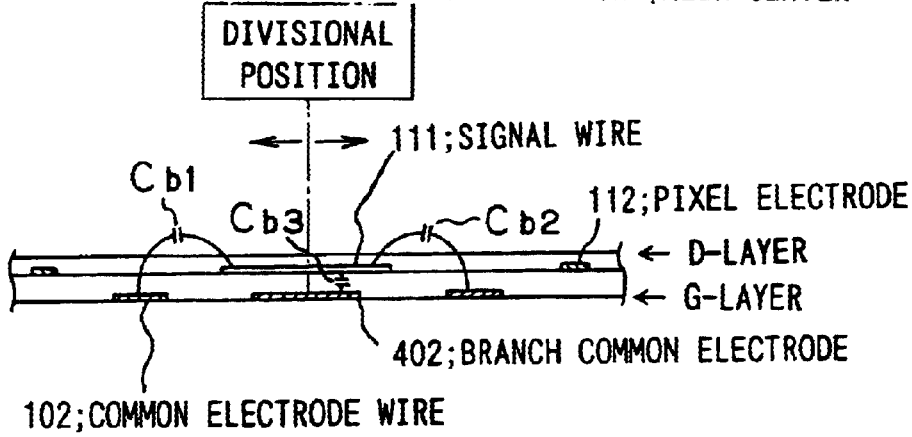

$Cb1, Cb2 \rightarrow$ DECREASE, $Cb0, Cb3 \rightarrow$ INCREASE $\Rightarrow \sum_{c=0}^{3} Cbc =$ CONSTANT

FIG. 10

⟨EVEN FRAME⟩

| + | + | + | + | + | + | + | + |
|---|---|---|---|---|---|---|---|
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |

↕ SWITCHING AT EVERY FRAME

⟨ODD FRAME⟩

| − | − | − | − | − | − | − | − |
|---|---|---|---|---|---|---|---|
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |

FIG. 11

<EVEN FRAME>

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

↕ SWITCHING AT EVERY FRAME

<ODD FRAME>

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

← DEVIATION DIRECTION OF LIGHT EXPOSURE (a) EXEMPLARY BAD PATTERN 1

VERTICAL STRIPES OBSERVED FAINTLY.
DIVISIONAL LINE OBSERVED
HALF TONE SOLID IMAGE IS DISPLAYED (b) EXEMPLARY BAD PATTERN 2

HALF TONE SOLID IMAGE IS DISPLAYED.
LATERAL CROSSTALK
WHITE OR BLACK WINDOW IS DISPLAYED (a) ADJACENT G LAYERS COME NEAR TO EACH OTHER WHILE A DIVISIONAL POSITION IS POSITIONED ON THEIR CENTER $$C_{a1} + C_{a2} \simeq C_{c1} + C_{c2} \ll C_{b1} + C_{b2}$$

(b) ADJACENT G LAYERS CAME AWAY FROM EACH OTHER WHILE A DIVISIONAL POSITION IS POSITIONED ON THEIR CENTER $$C_{a1} + C_{a2} \simeq C_{c1} + C_{c2} \gg C_{b1} + C_{b2}$$

(a) ADJACENT D LAYERS COME NEAR TO EACH OTHER WHILE A DIVISIONAL POSITION IS POSITIONED ON THEIR CENTER (b) ADJACENT D LAYERS CAME AWAY FROM EACH OTHER WHILE A DIVISIONAL POSITION IS POSITIONED ON THEIR CENTER

ACTIVE MATRIX LIQUID CRYSTAL DISPLAY DEVICE HAVING PARTICULAR CAPACITANCE PATTERNS

FIELD OF THE INVENTION

The present invention relates to a liquid crystal display device, more particularly to a technology for improving a display quality of an active matrix display device. The technology employed in this invention is preferred in applying especially to the active matrix display device in which signal wires and common electrode of a display panel are formed in different layers from each other and whose display part is manufactured through divisional light-exposing.

DESCRIPTION OF THE RELATED ART

In a liquid crystal display device, images are displayed by applying an electric field to a liquid crystal material. As a method of applying the electric field, there is a static driving method by which a constant voltage signal is constantly applied to each electrode of a display panel. However, this method requires an enormous number of signal wires if a display is large in size. As a result, multiplex driving methods in which the signal voltage is applied by time-sharing are employed in this case. Among the multiplex driving methods, an active matrix method provides a high display quality since an electric charge given to the electrode can be retained until next frame.

Concerning the direction of the electric field to be applied to a liquid crystal material, the method is classified into two modes, i.e., one mode for applying the electric field perpendicular to glass substrates sandwiching the liquid crystal material, and the other mode for applying the electric field in parallel to the substrates (In-plane Switching which is often abbreviated as "IPS"). The In-Plane Switching mode is appropriate for use in a large scale monitoring since it can realize a wide field of view in terms of angle.

FIG. 5 shows an electrode structure concerning the pixel of a liquid crystal display device to which the In-Plane Switching mode is applied for driving, e.g., refer to the disclosure of Japanese Patent Kokoku Publication JP-B-63-21907/1988. This reference discloses a liquid crystal display device having a display panel equipped with a pair of substrates. One of the substrates has display electrodes (pixel electrodes) and reference electrodes (common electrodes) thereon, both electrode being formed as comb-shaped electrodes intermeshing each other. The liquid crystal display device is driven by applying an electric field having a component in parallel to the substrate surface of the panel.

Now, the structure of a conventional liquid crystal display device will be explained. FIG. 6 is a plan view showing the whole structure of a liquid crystal display panel 501. Referring to FIG. 6, display parts 504 are connected to leading wires 503. The leading wires 503 are connected to connection terminals 502, respectively. Divisional positions illustrated in FIG. 6 by vertical and horizontal broken lines correspond ideally to the dividing positions between the display parts produced through divided exposure of light within an entire plane.

Namely, the display parts of a liquid crystal display device employing the IPS mode for driving the liquid crystal are prepared by patterning through the divisional light-exposing. The divisional light-exposing in this manner can take the following advantages:
1. Photomasks are of a low price; and
2. A display panel of a large size can be produced.

Because the light-exposing area of one shot is limited

FIG. 5 is an enlarged fragmentary plan view showing the vicinity of the divisional positions illustrated in FIG. 6. In a constitutional example illustrated in FIG. 5, the divisional position is at the center of a signal wire 111 or of a scanning wire 101. Setting the divisional line on the center of a signal wire 111 or of a scanning wire 101 in this manner is mainly due to the following advantages:
1. good symmetry;
2. easy design of patterns; etc.

A pixel for display includes scanning wire 101, signal wire 111 and common electrode wire 102, which are connected to an outside driving circuit. The display pixel further includes a switching element of a TFT (Thin Film Transistor) 131 and comb-shaped pixel electrode 112.

FIG. 7 is a cross sectional view taken along line a–a' of FIG. 5. Referring to FIG. 7, the common electrode wires 102 are formed on a glass substrate 113 of the TFT side, and the pixel electrodes 112 as well as the signal wires 111 are formed thereon through an intermediary of an interlaminar insulating film 105. The pixel electrodes 112 and the common electrode wires 102 are arranged alternatingly in parallel. These electrodes are covered with a protective insulating film 106, on which an orientation film 107 for orientating liquid crystal 301 is coated. Then, the top: of the orientation film 107 is treated by rubbing to complete a substrate 114 of the TFT side.

On a glass substrate 203 of a color filter (abbreviated as "CF") side, a black matrix 201 and color layer 202 for color display are formed in this order. Further, on the color layer 202, leveling film 207 for leveling the top of the substrate 203, and orientation film 207 for orientating the liquid crystal 301 are provided in this order. The top of the orientation film 207 is then treated by rubbing in a direction reversed of the rubbing direction of the orientation film 107 of the TFT side.

Thus, a substrate 208 of the color filter side is completed. Then, the liquid crystal 301 and spacer 302 (e.g., spherical particles) are encapsulated in between both of the substrates 114 and 208. The gap therebetween is determined by a particulate diameter of the spacer 302.

Finally, a polarizing plate 110 of the TFT side is adhered to the surface of the TFT side glass substrate 113 on which no electrode pattern is formed; and a polarizing plate 205 of the CF side., to the surface of the glass substrate 203 on which no pattern is formed. In this process, the polarizing plate 110 is arranged to make a light-transmitting direction (axis) therethrough perpendicular to the rubbing direction of the orientation film 107. The CF side polarizing plate 205 is arranged to make a light-transmitting direction therethrough perpendicular to that of the TFT side polarizing plate 110. A liquid crystal display panel is completed through the above steps.

In the course of forming a pattern of a layered form on the glass substrate 113 of the TFT side, light is exposed area by area to all of the spots (ideally) divided by the divisional positions shown in FIG. 5. Hereinafter, a layer in which common electrode wires 102 and scanning wires 101 are to be formed or formed may be referred as "G layer"; a layer in which signal wires 111 and pixel electrodes 112 are to be formed or formed, to "D layer".

Function of the conventional liquid crystal display will be explained as follows.

Referring to FIG. 6, signal voltages applied to connection terminals 502 are input correspondingly through leading wires 503 into scanning wires 101, signal wires 111 and common electrode wires 102, as illustrated in FIG. 5.

When a signal of "ON voltage" is input through a scanning wire 101, electric charge flows from a signal wire 111 into a pixel electrode 112 through a TFT 131

FIG. 8 shows a time chart of electric potentials applied to the scanning wire 101, signal wire 111 or common electrode wire 102, respectively.

When a potential difference is produced between scanning wire 101, common electrode wire 102 and pixel electrode 112, a lateral,electric field is applied to the liquid crystal layer in parallel to the substrates corresponding to the potential difference. As a result, liquid crystal molecules are turned to be parallel to the substrates. Then, light transmittance is changed correspondingly in the area between the neighboring parallel extending wires, e.g., between the common electrode wire 102 and the pixel electrode 112.

FIG. 9 shows the qualitative relation of potential difference and light transmittance in between common electrode wire and pixel electrode. According to this relation, light transmittance can be appropriately controlled for driving a liquid crystal display device.

A typical conventional method relating to the pole inversion of an electric field applied to the signal wire includes the following two modes.

One is so-called "gate line inversion driving" mode schematically shown in FIG. 10. This mode is for driving a liquid crystal display panel so that lateral one line has always the same polarity. Polarity of the same line is switched at every frame (i.e., even frame after odd frame).

The other is so-called "dot inversion driving" mode schematically shown in FIG. 11 for driving the display panel so that polarity is changed alternately in a checked pattern. Further, the polarity is switched at every frame.

The method of the pole inversion further includes drain inversion driving mode, frame inversion driving mode and the like. The former is for inverting the polarity of the signal wire controlled to have the same polarity line by line at every frame. The latter is for inverting the polarity for every frame having the same polarity over the entire display face.

Among those methods, the dot inversion driving mode is the most advantageous in display quality, since it causes the least flicker and crosstalk in a displayed image. These defects are little worth consideration as compared with those caused by other modes.

SUMMARY OF THE DISCLOSURE

However, there are problems encountered in the course of the investigations toward the present invention. Namely, the following image defects will be observed in the liquid crystal display device employing the IPS mode, in case where there is deviation in the precision of the light exposing position, i.e., the edge of exposed light spot is deviated from a divisional position upon forming a wiring pattern through the aforementioned divisional light-exposing:

1. emphasized (sharp) separation line corresponding to the divisional position
2. vertical faded (faint) stripes
3. crosstalk In a case of the light-exposure deviation (i.e., where an image (solid image of half tone) is intended to be displayed on the screen of a display panel obtained through the step of the divisional light-exposing accompanied with the above displacement from the divisional line), for example, as shown in FIG. 12, image defects such as fluctuation of brightness, crosstalk and the like will appear.

The causes of the above defects will be discussed below taking especially the case of the dot inversion driving mode as an example.

In forming a wiring pattern through the divisional light-exposing, precision capable of coinciding the contour (edge) of the divisionally exposed light spot with the divisional position is in the order of about 0.5 μm. Accordingly, the deviation (displacement) of the light spot contour from the divisional position may be produced in the same extent. As a result, a pattern of the divisionally light-exposed spot may be shifted to right and left or up and down. This shift of the pattern causes a change in the electric characteristics of a display panel to bring about a problem in the optical properties change.

Let's consider the case of displacing the light spot contour from the divisional position as exemplary illustrated in FIG. 14(a) to shift two of the adjacent G layers on the right and left to each other to the direction that they come near to each other with the divisional position being at the center. In this case, parasitic capacities $Ca1$, $Ca2$, $Cb1$, $Cb2$, $Cc1$ and $Cc2$ between signal wires 111 and their neighboring common electrode wires 102 on both sides thereof are increased or decreased as follows as compared with those in the case of no displacement occurring on the divisionally exposed light spot. The capacities $Ca1$, $Cb1$, $Cb2$ and $Cc2$ increase, while capacities $Ca2$ and $Cc1$ decrease. Consequently, $Ca1 + Ca2 \approx Cc1 + Cc2 << Cb1 + Cb2$.

Accordingly, the parasitic capacity connected to the signal wire 111 disposed at the divisional line becomes distinctly large as compared with others.

When signals are input into a display panel instructing the display panel to display a solid image by the dot inversion driving mode, electric potentials of two adjacent signal wires would have the same amplitude but opposite polarities to each other. In the ideal case where no displacement of the light exposure appears, the electric potential of the common electrode wires adjacent to each of the signal wires will not be affected by the change in the electric potential of the signal wires because of compensation by+and−. In this contrast, when the displacement of the light exposure occurs as shown in FIG. 12, two of the parasitic capacities in each of right and left elements divided at the center divisional position become asymmetric which are connected to both sides of the signal wire of the divisional position. As a result, the electric potential of the common electrode wires 102 will be affected by the change in the electric potentials of the signal wires.

FIG. 16 shows the relation of the electric potentials of signal wires, common electrode wire and scanning wire in case where the potential of the common electrode wire is affected by the potentials of the neighboring signal wires. The abscissa represents "time"; the ordinate, "voltage". In case of applying the dot inversion driving mode, the polarity is different at every neighboring element. Namely, when an element has positive (or negative) polarity, the element adjacent thereto has negative (or positive) polarity. As can be seen from FIG. 16, the actually applied ("written") potential difference between the common electrode and the pixel electrode in each of the elements differs from one to another depending on the polarity and the direction of deviation at the time the signal "ON voltage" is applied to the signal wire to switch the TFT element "ON" in the case where the potential of the common electrode wire (shown in FIG. 16 by a broken line) is affected (deviated) by the potentials of the signal wires.

The code "Vright" or "Vleft" in FIG. 16 represents the maximum potential difference between a pixel electrode and a signal wire disposed in the right or left element, respectively. The common electrode wire is not independent (separated) for every element so that the potential of the common electrode wire located apart from the divisional position is also affected by the potential of the signal wire to some extent, correspondingly.

As explained in the above, the difference (fluctuation) in brightness on the screen of the display panel is caused depending on the applied polarity (+or−).

This phenomenon is schematically illustrated in FIG. 17. The abscissa represents the "displayed position" the ordinate, the "brightness". The difference in the brightness becomes maximum at the divisional position where the deviation effect of the potential of the common electrode wire is at the maximum. This difference decreases depending on the time constant of the common electrode wire in proportion to the distance of the displayed position from the divisional position.

This is the reason why the emphasized (sharp) line as a divisional line is observed at the divisional position and the vertical faded (faint) stripes are observed all over the screen of the display panel as schematically illustrated in FIG. 13(a).

In this addition, lateral crosstalk is observed when an image of white or black window as schematically illustrated in FIG. 13(b) is displayed on the screen of the display panel. This is caused by the difference in the extent of deviations of the common signal wires, i.e., between ones generated by the signal wires which are used for display the white or black window and the others which are not used.

On the other hand, when the adjacent right and left G layers shifted in the direction that they come apart from each other as illustrated in FIG. 14(b) with the divisional position being on the center, a relation of Ca1+Ca2≈Cc1+Cc2>>Cb1+Cb2 is established to cause the same phenomenon as explained in the above.

When the light exposure is deviated (displaced) from the divisional position so as to shift two of the adjacent right and left D layers to each other toward the center as illustrated in FIG. 15(a) with the divisional position being on the center, a relation of Ca1+Ca2≈Cc1+Cc2>>Cb1+Cb2 will be established.

When the light exposure is displaced from the divisional position to shift two of the adjacent right and left D layers in the direction that they come apart from each other as illustrated in FIG. 15(b) with the divisional position being on the center, a relation of Ca1+Ca2≈Cc1+Cc2<<Cb1+Cb2 will be established to cause the aforementioned phenomenon.

When the displacements as illustrated in FIGS. 14(a) and 15(b) or 14(b) and 15(a) occurred simultaneously, the display quality (image quality) deteriorate more distinctly.

All of these faults essentially result from the above displacement which causes the difference in the parasitic capacity between the signal wire 111 and the common electrode wire 102 in the vicinity of and relative to the divisional position. The deterioration of the image quality increases as the number of the divisions increases.

The above phenomena are observed to any extent, large or small, also in the case where other modes than the dot inversion driving mode are applied.

Accordingly, the present invention has been made in consideration of the above problems. It is an object to provide an active matrix liquid crystal display device whose display portion is manufactured by patterning through the divisional light exposure and which is improved in display quality by reducing emphasized separation lines corresponding to the divisional positions, vertical faint stripes and lateral crosstalk resulting from the deviation of the light exposure.

According to one aspect of the present invention, there is provided an active matrix liquid crystal display device comprising signal wires formed in one layer and common electrodes formed in another layer on a display face by patterning through divisional light-exposing. The liquid crystal display device of the present invention is characterized by compensating capacity patterns each provided on the signal wire and/or the common electrode so that a parasitic capacity at the divisional part does not differ from that disposed on other positions remote from the divisional part, said parasitic capacity being generated between a signal wire and a common electrode disposed closest thereto.

According to a second aspect of the present invention, there is provided an active matrix liquid crystal display device, in which a liquid crystal is driven by an electric field component parallel to a substrate surface of a display panel, and which has one layer comprising scanning wires and common electrodes as well as another layer comprising signal wires and pixel electrodes on a substrate of the display panel, both the layers being patterned through divisional light-exposing. The device is characterized by compensating capacity patterns provided on the signal wire and/or the common electrode so as to make parasitic capacity at the divisional part substantially equal to parasitic capacity at positions other than the divisional part in terms of the parasitic capacity between the signal wire and the common electrode wire nearest therefrom.

According to a third aspect, it is preferred that each of the compensating capacity patterns is a branch electrode provided on the signal wire, projected laterally from the longitudinal periphery of the signal wire, extended beyond the common electrode nearest from the signal wire, and then bent to be extended by a predetermined distance parallel to the signal wire.

According to a fourth aspect, it is preferred that each of the compensating capacity patterns is a branch electrode provided on the common electrode, projected therefrom so as to be superimposed with the signal wire when viewed from the top and extended by a predetermined distance along the longitudinal direction of the signal wire.

According to a fifth aspect, there is provided an active matrix display device, in which a liquid crystal is driven by an electric field having a component parallel to a substrate surface of a display panel, on one substrate of which one layer comprising scanning wires and comb-shaped common electrodes as well as another layer comprising signal wires perpendicular to the scanning wires and pixel electrodes, the two layers being patterned through divisional light-exposing, at least the signal wires being periodically on the divisional position. The display device is characterized by the following features:

(a) that branch electrodes, each of which is projected from one or both longitudinal peripheries of the signal wires, extended beyond a comb-shaped portion of the common electrode nearest therefrom, and then bent to extend a portion by a predetermined distance parallel to the signal wire, (b) that in case where the signal wire on the divisional position is deviated upon the light-exposing, parasitic capacity on the divisional position is made substantially equal to parasitic capacity at positions other than the divisional position by decreasing/increasing parasitic capacity at the divisional position between the bent and extended portion of the branch electrode and the nearest comb-shaped portion of the common electrode according to increasing/decreasing the parasitic capacity at the divisional position between the branch electrode and the comb-shaped portion of the common electrode to make the sum of the parasitic capacities invariable.

According to a sixth aspect of the present invention, there is provided an active matrix display device, in which a liquid crystal is driven by an electric field having a component parallel to a substrate surface of a display panel, and which has one layer comprising scanning wires and comb-shaped common electrodes as well as another layer comprising signal wires perpendicular to the scanning wires and pixel electrodes on one substrate of the display panel, the two layers being patterned through divisional light-exposing by assuming divisional positions at least on said signal wires. The display device is characterized by the following features:

(a) that auxiliary electrode patterns are arranged, each of which is projected with a predetermined width from the common electrode to be superimposed with the signal wire when viewed from the top and extended by a predetermined distance along the longitudinal direction of the signal wire, (b) that in case where the signal wire on the divisional position is deviated upon the light-exposing, parasitic capacity on the divisional position is made substantially equal to parasitic capacity at positions other than the divisional position by decrease/increase of parasitic capacity at the divisional position between the signal wire and the auxiliary electrode caused by decreasing/increasing the overlapped area of the same signal wire and the same auxiliary electrode according to increasing/decreasing parasitic capacity at the divisional position of between the signal wire and the comb-shaped portion of the common electrode to make sum of the parasitic capacities invariable.

According to a seventh aspect, there is provided an active matrix display device which comprises:

(a) pixels each composed of a pixel electrode, a common electrode wire and an active element; scanning wires and signal wires disposed on a first transparent substrate provided with a liquid crystal orientation film disposed directly or through an intermediary of an insulating layer;

(b) a liquid crystal layer sandwiched between the first transparent substrate and second transparent electrode disposed opposite each other through an intermediary of the liquid crystal orientation film;

(c) each of the electrodes being adapted to apply an electric field to the liquid crystal layer substantially in parallel to the substrates;

(d) the pixels each being connected to an outside control means for arbitrarily controlling an electric field to be applied depending on patterns to be displayed; and (e) polarization means for changing a polarized state of an incident light transmitting through one of the substrates, (f) the display device being manufactured by a process comprising a step of patterning the pixel electrodes, the common electrode wires and the scanning wires through divisional light-exposing, (g) wherein capacity patterns are compensated to make parasitic capacities between the signal wire and the common electrode wire substantially equal to each other in the whole region of the display face even upon overlapping deviation produced in the light-exposing step between a layer comprising the scanning wires and the common electrode wires and a layer comprising the signal wires and the pixel electrodes.

Preferably, each of the compensating capacity patterns is composed of a branch electrode attached to the signal wire.

Also each of the compensating capacity patterns may be composed of a branch common electrode added to the common electrode wire.

Preferably, the compensating capacity patterns are composed of a branch electrode added to the signal wire and a branch common electrode added to the common electrode wire.

BRIEF DESCRIPTION OF THE DRAWINGS

FIG. 4 is a schematic cross sectional view taken along c–c' line of FIG. 3 for explaining the action regarding the second embodiment of the present invention.

Figure 10:
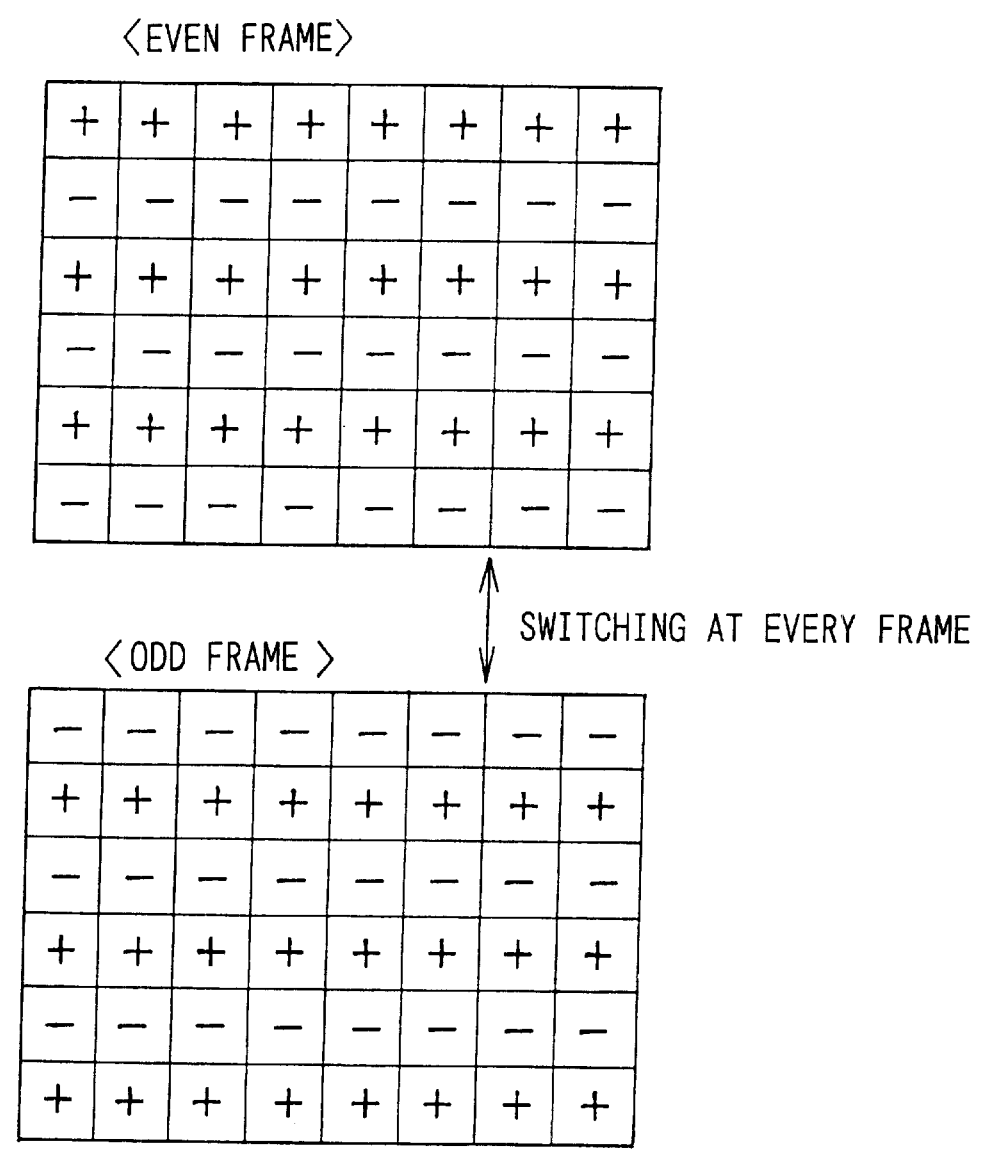

FIG. 10 is an explanatory view of a gate line inversion driving mode.

Figure 11:
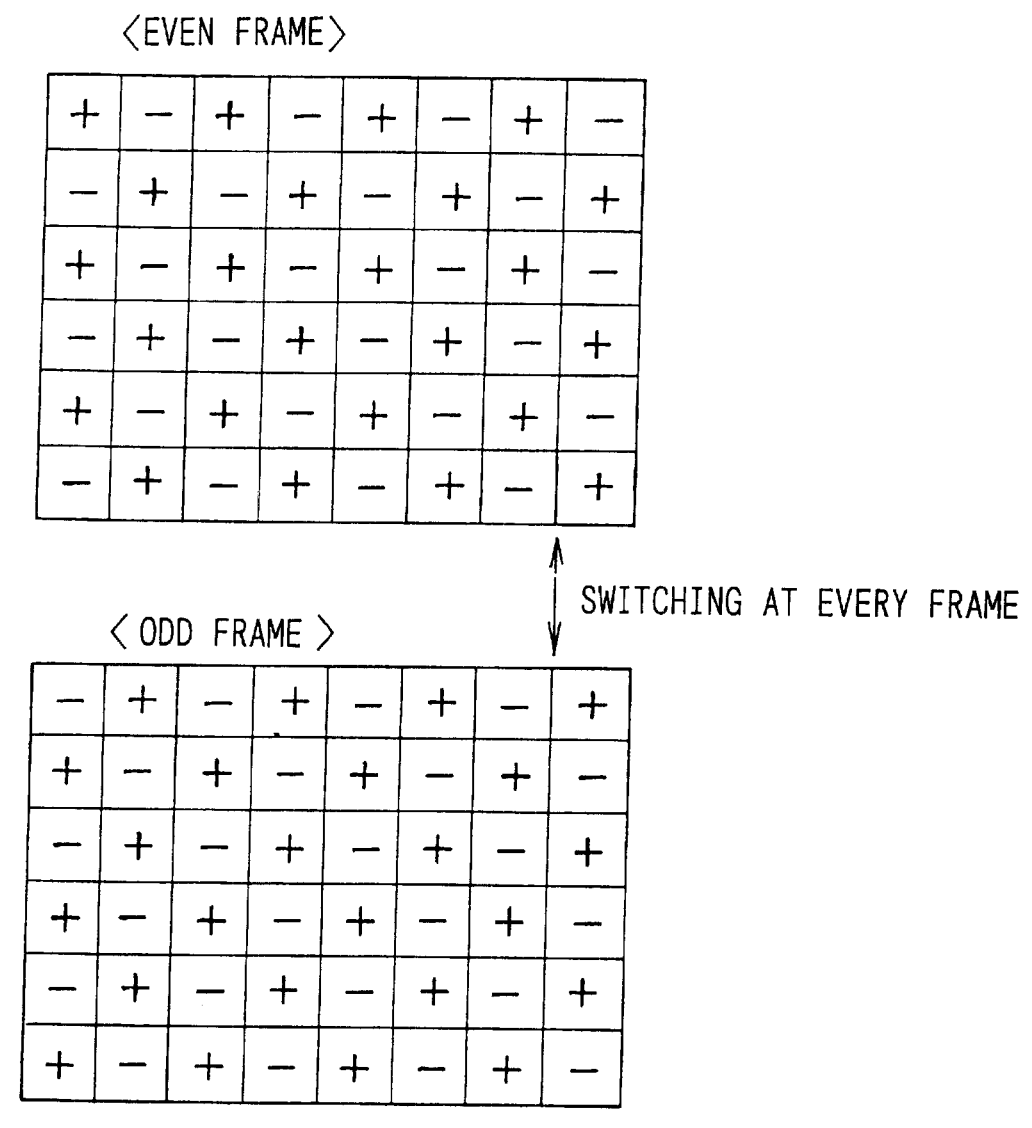

FIG. 11 is an explanatory view of a dot inversion driving mode.

PREFERRED EMBODIMENTS OF THE INVENTION

Figure 1:
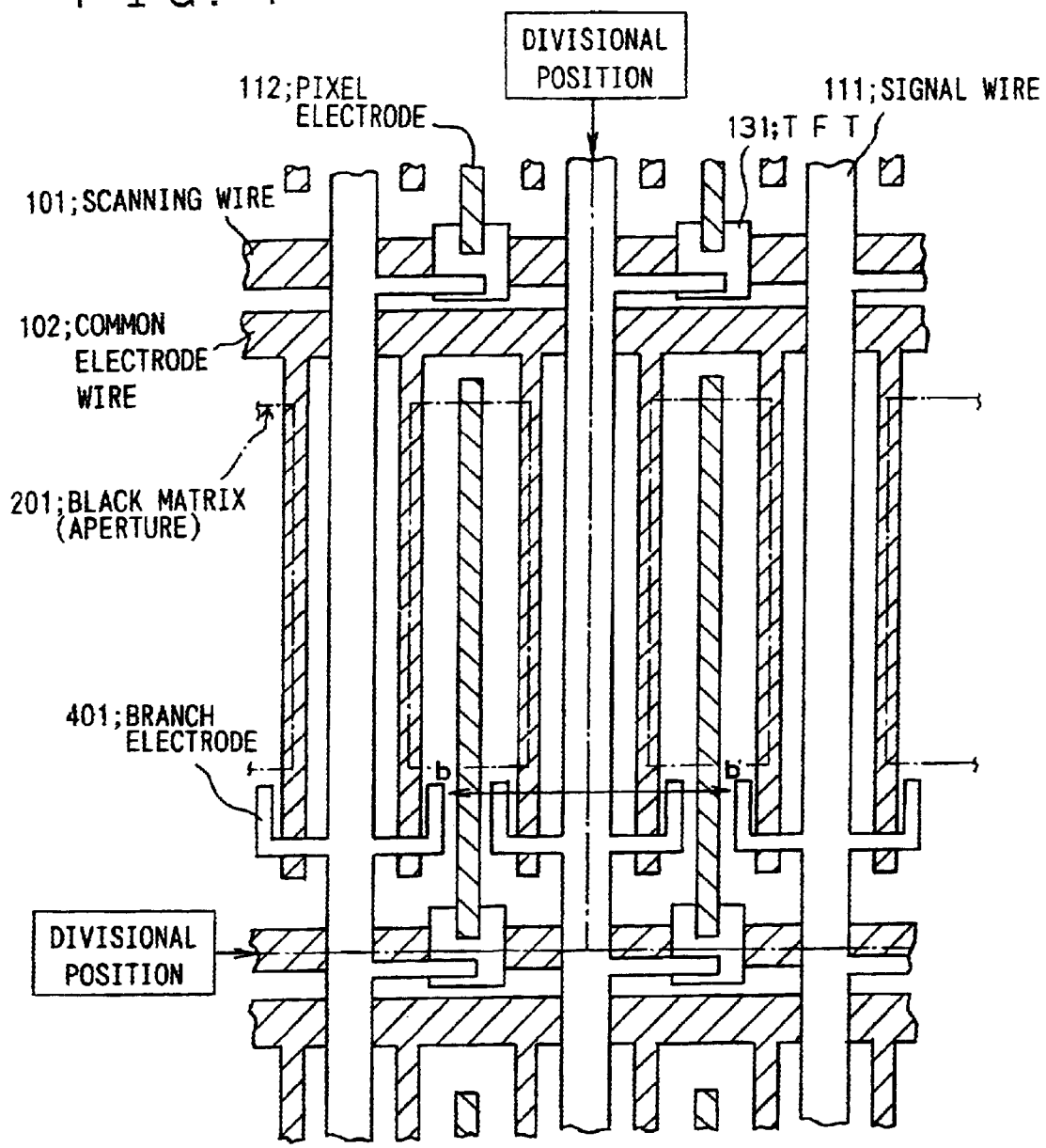
FIG. 1 is a plan view showing a first embodiment of the present invention.

The embodiment of the present invention will be explained now. A liquid crystal display device of the present invention in its preferred embodiment has a plurality of pixels each composed of pixel electrode (112 in FIG. 1), common electrode wire (102 in FIG. 1) and active element (131 in FIG. 1), scanning wires (101 in FIG. 1) and signal wires (111 in FIG. 1) on a first transparent substrate (113 in FIG. 7) having a liquid crystal orientation film (107 in FIG. 7) on these wiring elements directly or through an intermediary of an insulating layer (105 in FIG. 7). A liquid crystal layer (301 in FIG. 7) is sandwiched between the first transparent substrate and second transparent substrate (203 of FIG. 7) disposed opposite thereto through an intermediary of the orientation film (207 in FIG. 7). The electrodes are constituted so as to make it possible applying an electric field to the liquid crystal layer substantially in parallel to the substrates. Each of the pixels is connected to an outside control means for arbitrarily controlling an electric field to be applied depending on patterns to be displayed. The polarized state of an incident polarized light transmitting through the substrate can be changed by the orientation of the liquid crystal layer. The liquid crystal display device is an active matrix liquid crystal display device manufactured by a process including a step of patterning the pixel electrodes, common electrode wires, signal wires and scanning wires through exposing light dividedly to all of the divided spots on the display face. The liquid crystal display device features to have compensating capacity patterns formed so as to make parasitic capacities between the signal wire and the common electrode wire equal to each other in the whole region of the display face even in case where overlapping deviation is produced in the light-exposing step between a layer including the scanning wires and the common electrode wires and a layer including the signal wires and the pixel electrodes.

In the above embodiment of the present invention, each of the compensating capacity patterns consists of a branch (horn-or antler-like) electrode (401 in FIG. 1) which is added to the signal wire (111 in FIG. 1).

Figure 3:
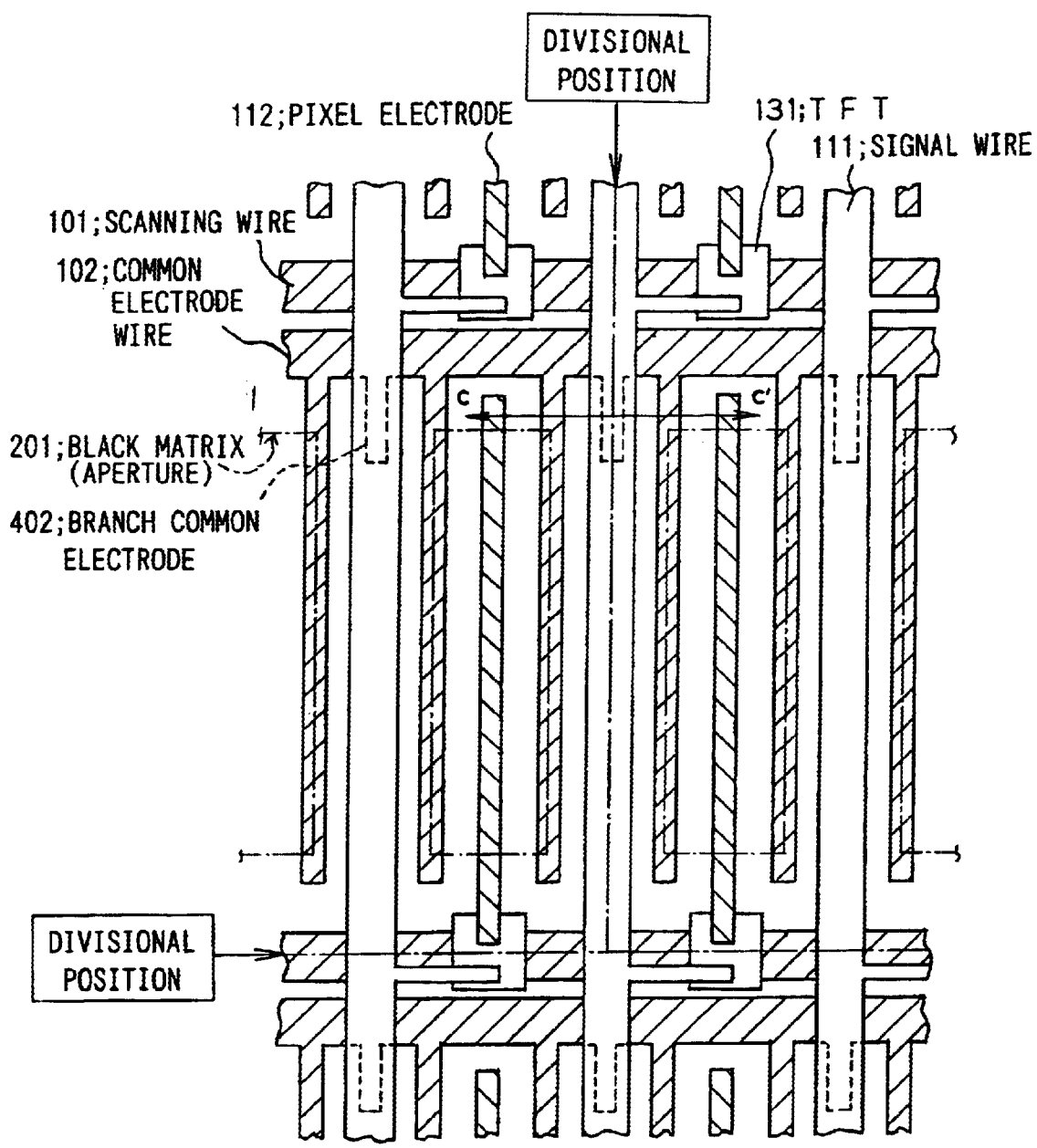
FIG. 3 is a plan view showing an essential part of a second embodiment of the present invention.
Figure 5:
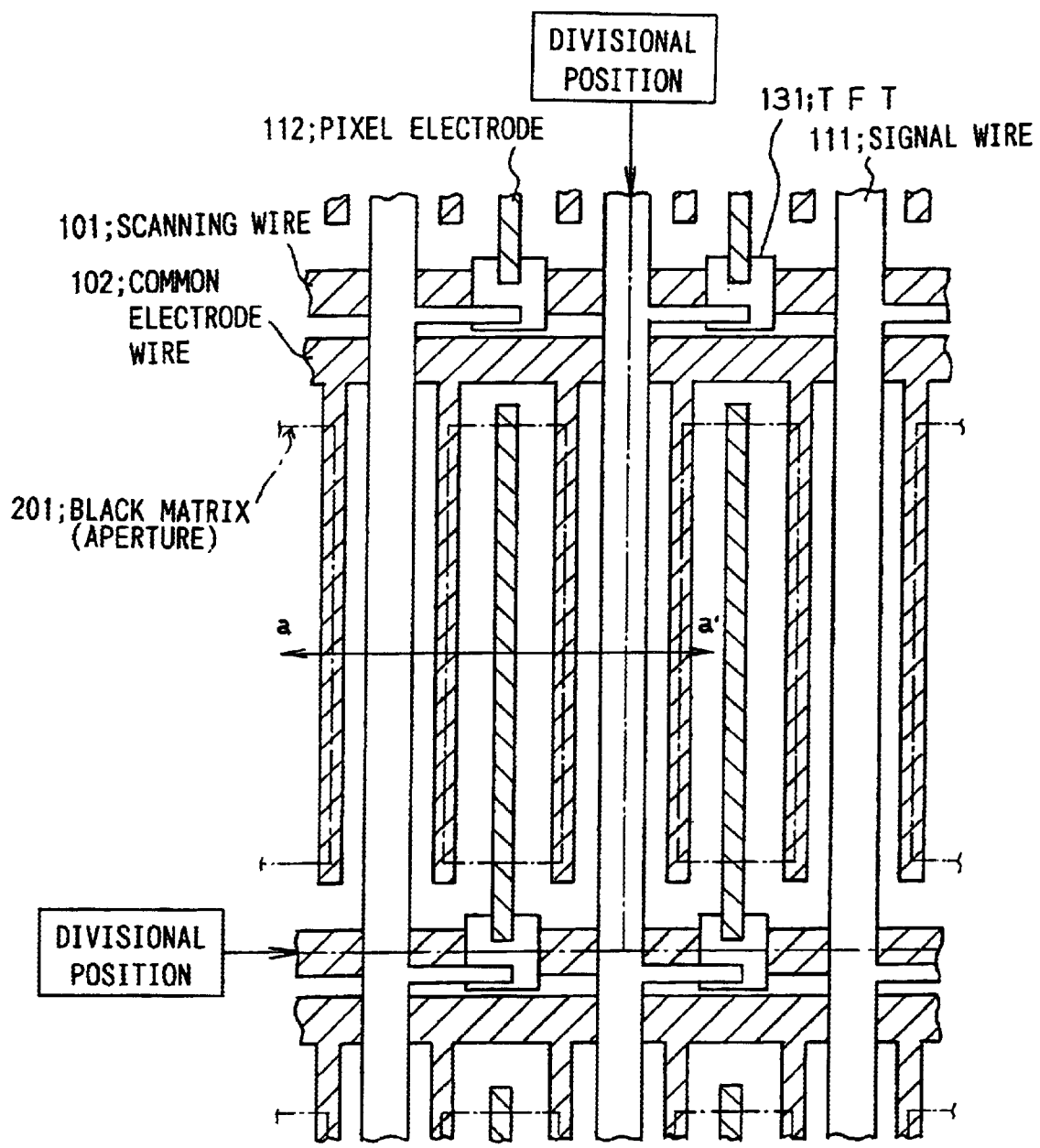
FIG. 5 is a plan view showing a part of a conventional liquid crystal display panel.
Figure 6:
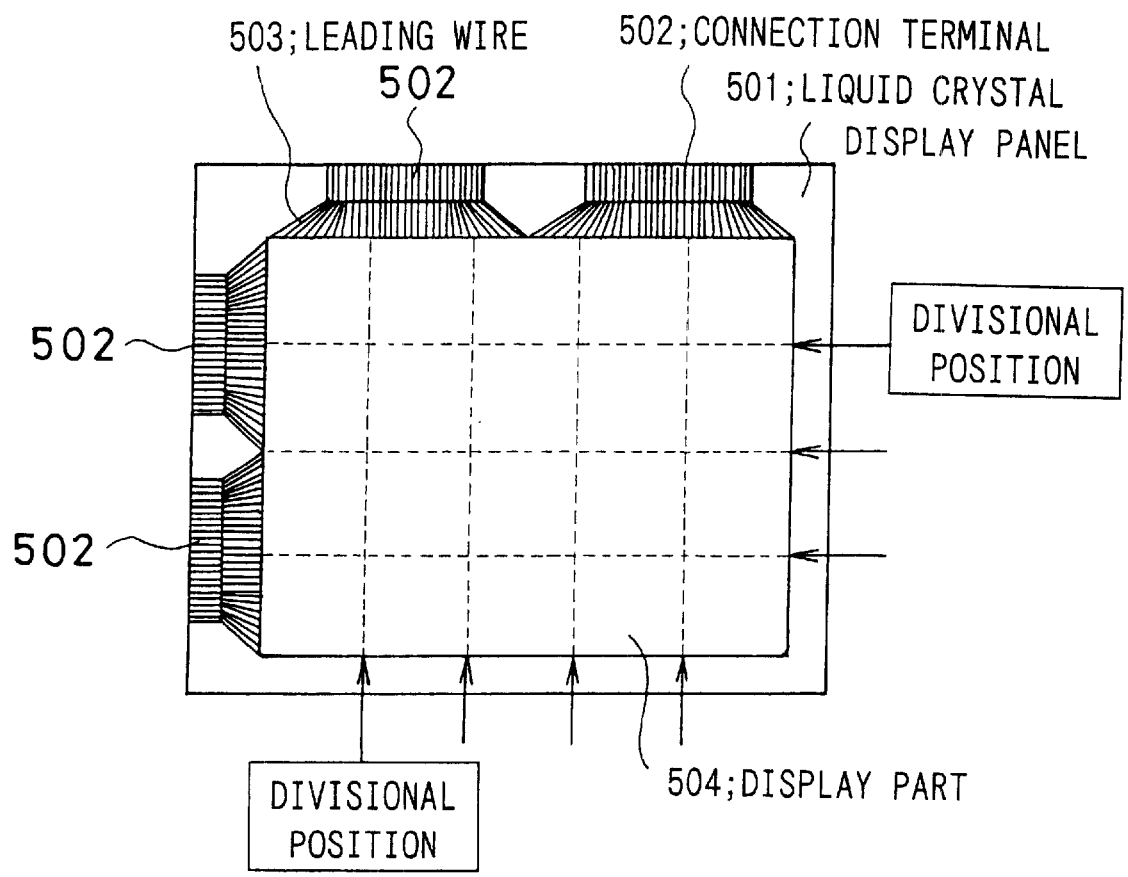
FIG. 6 is a plan view showing an entire constitution of a liquid crystal display panel.

In another embodiment of the present invention, each of the compensating capacity patterns may be a branch electrode (402 in FIG. 3) added to the common electrode wire (102 in FIG. 3).

In another embodiment of the present invention, each of the compensating capacity patterns may be a branch electrode (e.g., in the shape of 402 in FIG. 3) added to the signal wire (111 in FIG. 1).

Further, the compensating capacity patterns may be any combination of the aforementioned two types of the branch electrodes to one or both of the common electrodes and the signal wires.

As indicated by the above embodiment, a display quality can be improved by the compensating capacity patterns according to the present invention. The compensating capacity patterns are capable of providing compensating capacities which reduces the deviation effect of the electric potential applied to signal wires on that applied to common electrode wires caused by the asymmetry of the two parasitic capacities between the signal wire and the common electrode wire (one is on one side of the signal wire, and the other is on the opposite side of the signal wire). This reduction of the deviation effect leads to inhibiting or reducing the emphasized thick separation line, the vertical faded (faint) stripes and the lateral crosstalk which can be found in display a solid image on the screen of a liquid crystal display device.

EXAMPLES

Examples of the present invention will be explained below in more detail in reference to the accompanying drawings. These examples are believed useful for understanding the present invention as exemplified in the above embodiment more deeply.

EXAMPLE 1

Figure 2:
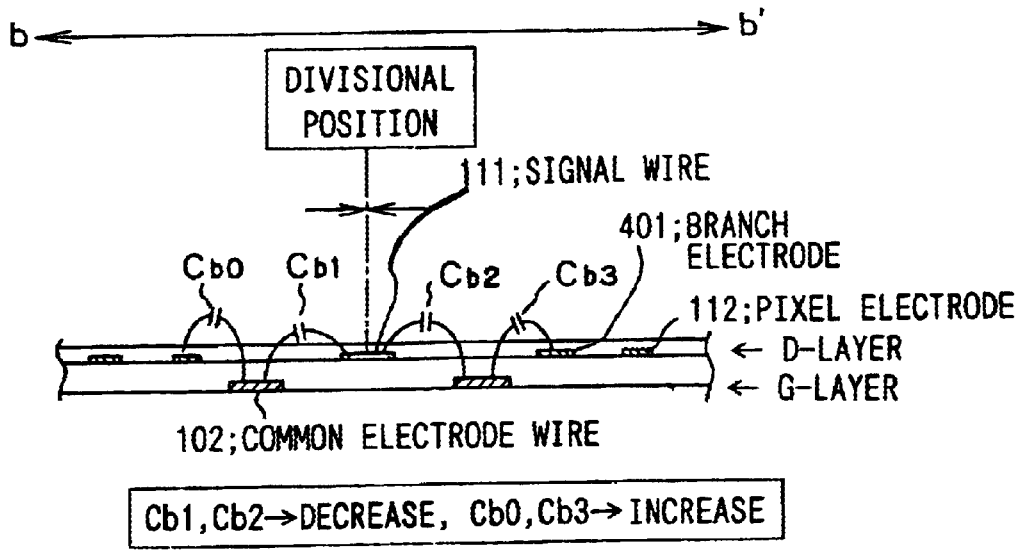
FIG. 2 is a schematic cross sectional view taken along b–b' line of FIG. 1 for explaining the action regarding the first example of the present invention.
Figure 2:
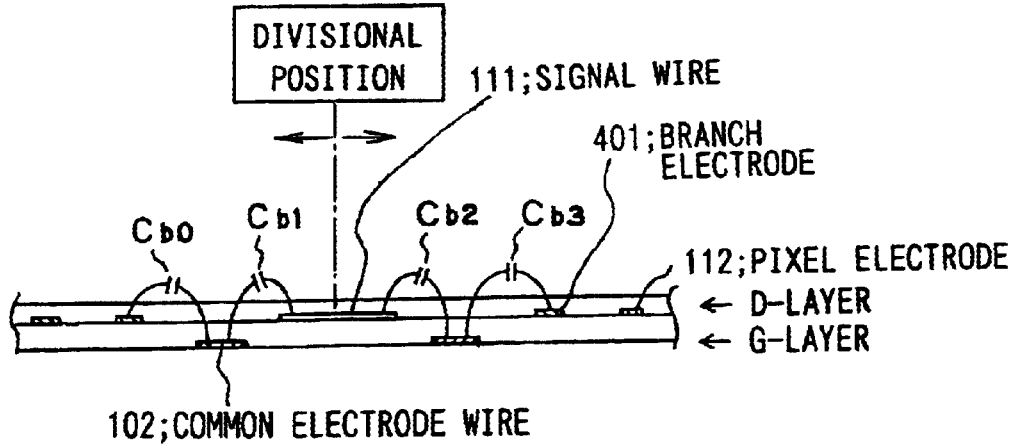

FIG. 1 is a plan view showing an essential part of a first exemplary liquid crystal display device of the present invention; and FIG. 2, a schematic cross sectional view taken along line b–b' of FIG. 1. Referring to FIG. 1, the first example of the present invention is different from the conventional liquid crystal display device in that the first example of the present invention has a branch electrode (horn-or antler-like shape) 401 which is added to the signal wire 111. Explaining more in detail, FIG. 1 is a plan view showing partially but distinctively one exemplary In-Plane Switching (IPS) liquid crystal display panel of the present invention produced through the step of the divisional exposing under the condition of positioning the signal wires and the scanning wires periodically on the divisional position. The pixel electrode 112 and the comb-shaped branched portions of the common electrode wire are arranged in parallel intermeshing each other. The branch electrode 401 is L-shaped and projected laterally of the signal wire 111 from both sides of its longitudinal peripheries, extended beyond its closest common electrode wire and then bent to be extended to a predetermined distance along (in parallel to) the longitudinal direction of the signal wire.

Figure 7:
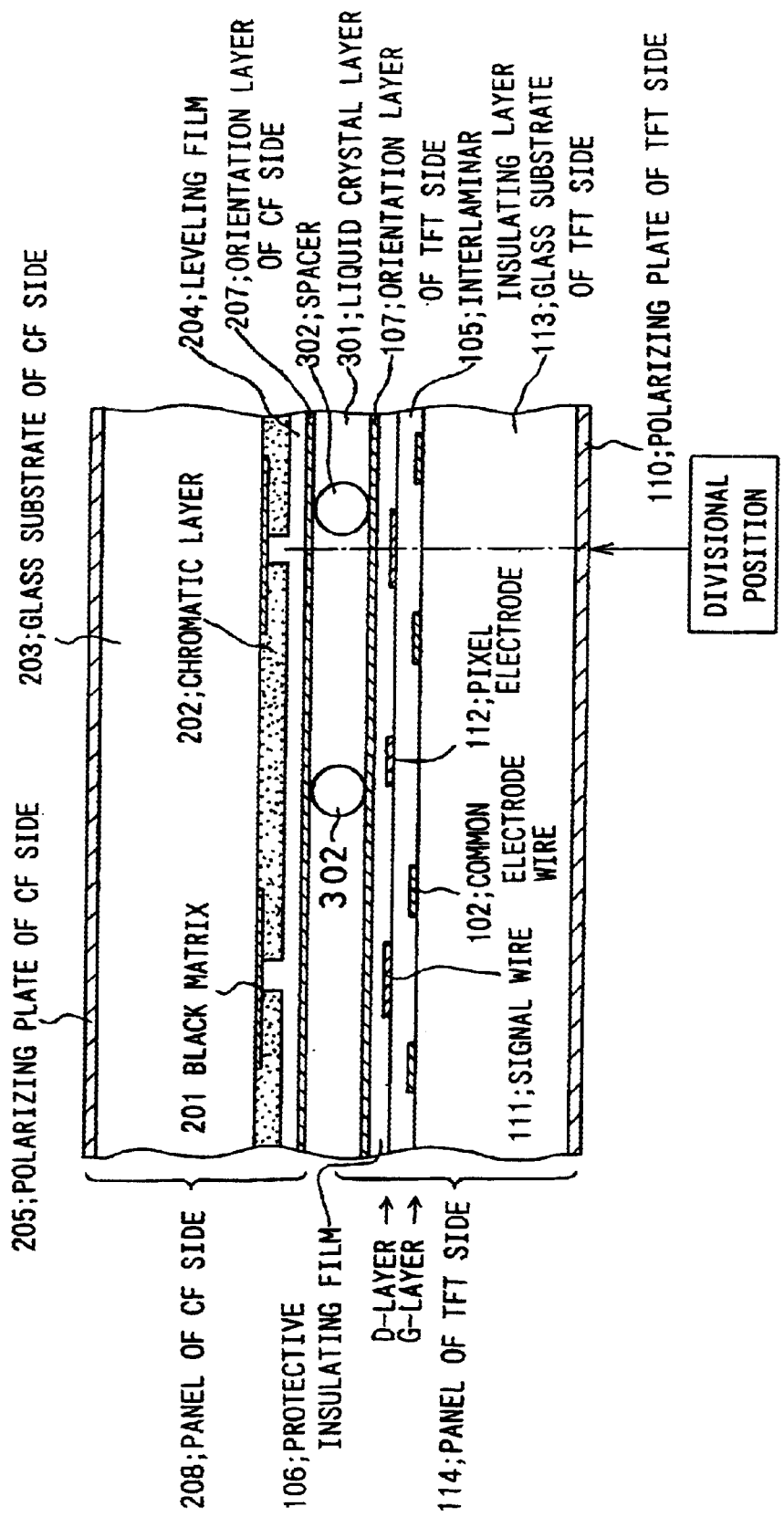
FIG. 7 is a cross sectional view taken along a–a' line of FIG. 5 showing a part of a conventional liquid crystal display panel.
Figure 8:
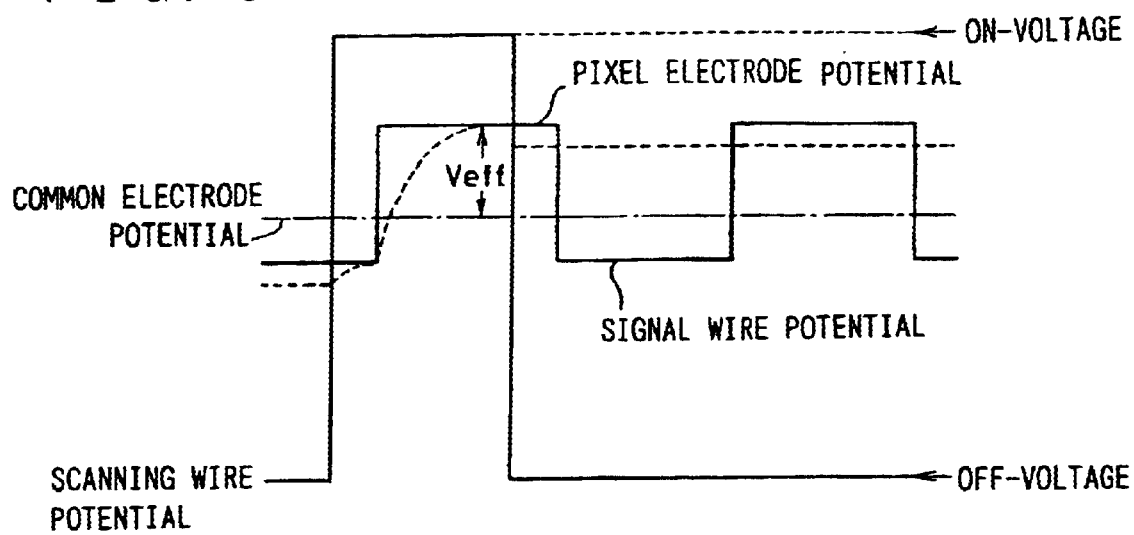
FIG. 8 is a time chart showing signals of wires and electrodes.
Figure 9:
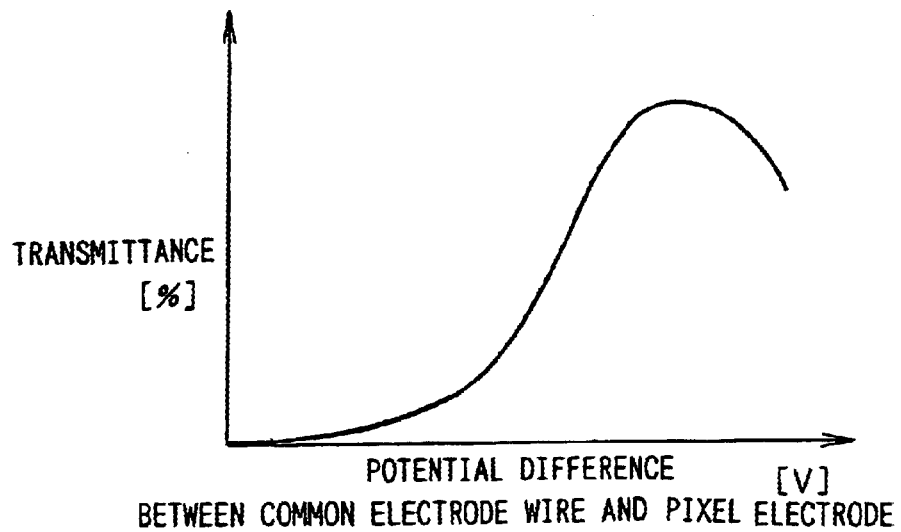
FIG. 9 is a graph showing the relation of potential difference and light transmittance through the area between common electrode wire and pixel electrode.
Figure 12:
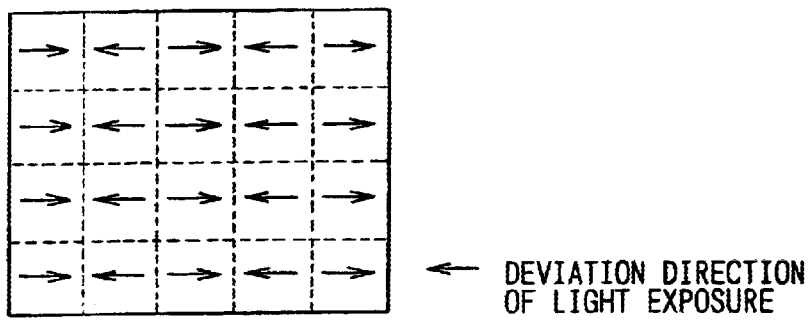
FIG. 12 is a view showing exemplary deviation directions of light exposure causing defects on a conventional liquid crystal display device.
Figure 13:
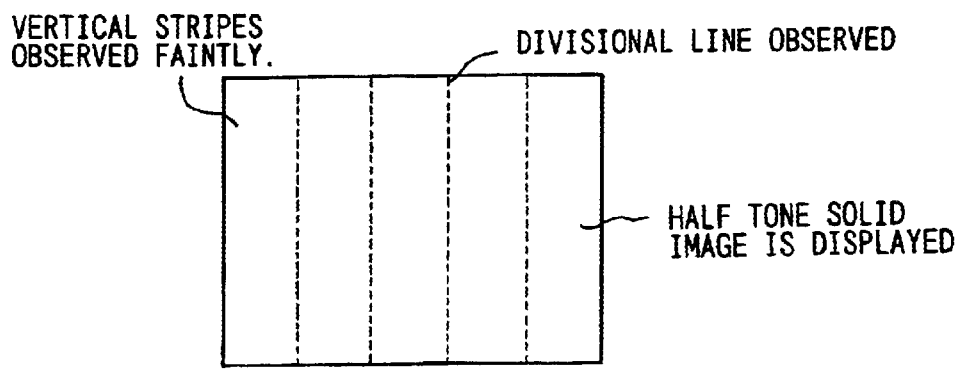
FIG. 13(a),(b) are schematic views showing defects appearing in a conventional liquid crystal display device.
Figure 13:
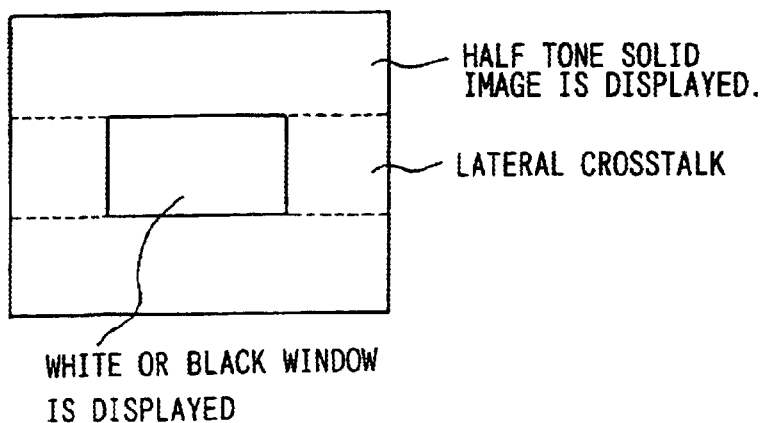
Figure 14:
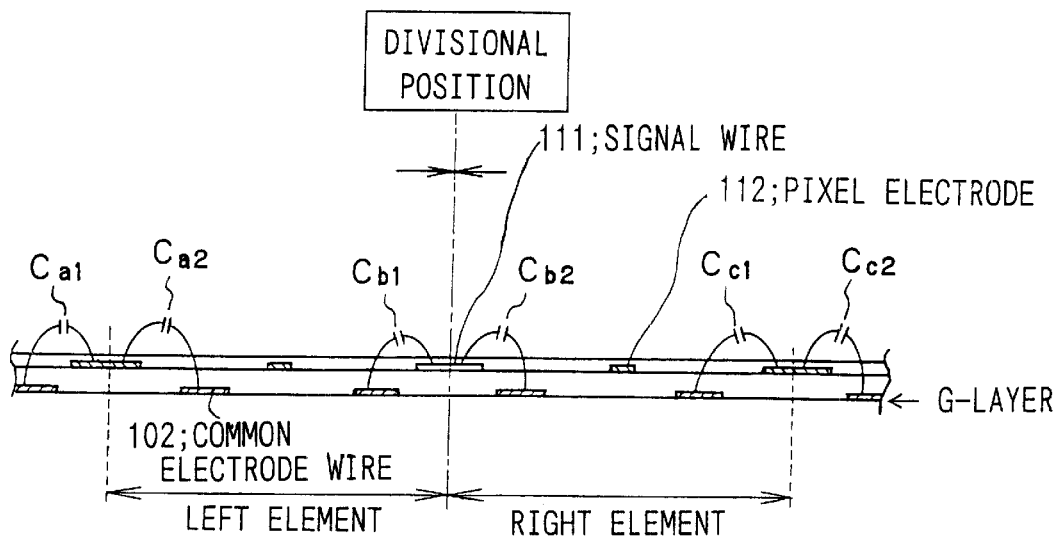
FIG. 14(a),(b) are explanatory views concerning mechanisms of bringing defects on a conventional liquid crystal display device (in case of G layers being deviated).
Figure 14:
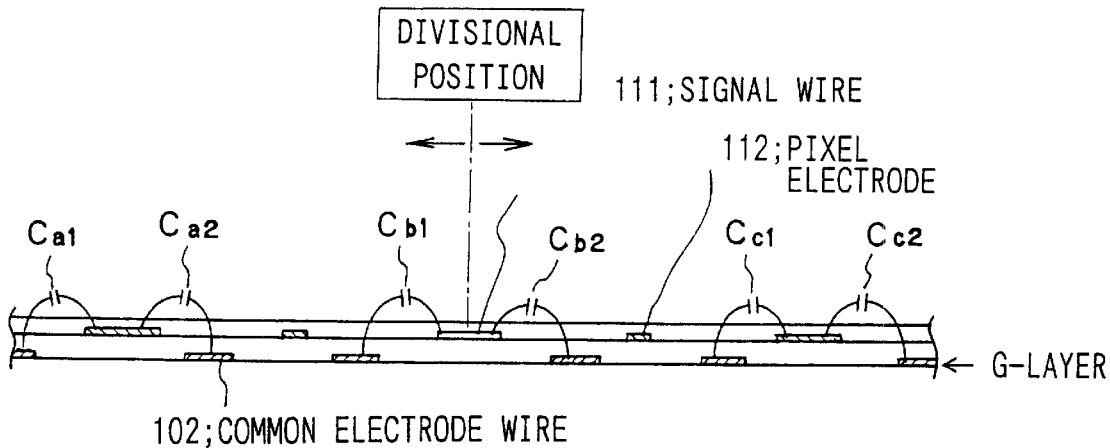
Figure 15:
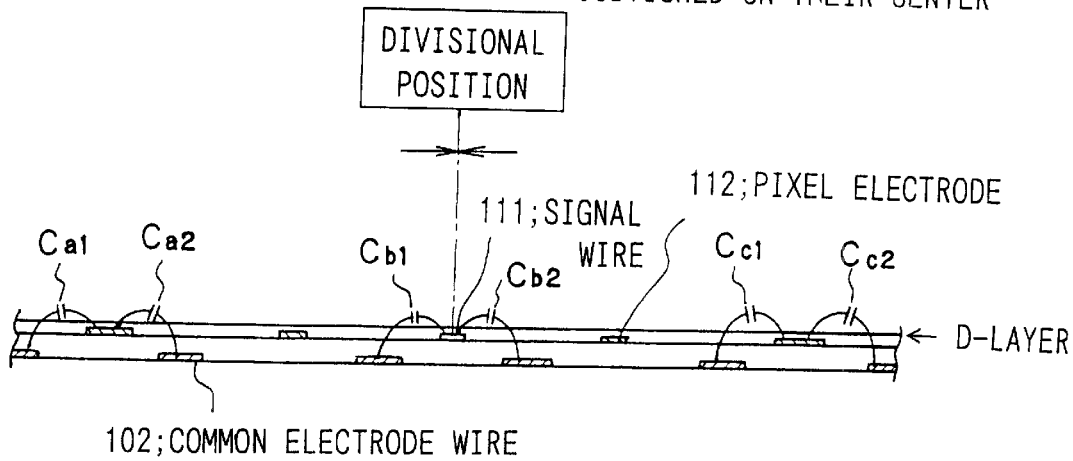
FIG. 15(a),(b) are explanatory views concerning mechanisms of bringing defects on a conventional liquid crystal display device (in case of D layers being deviated).
Figure 15:
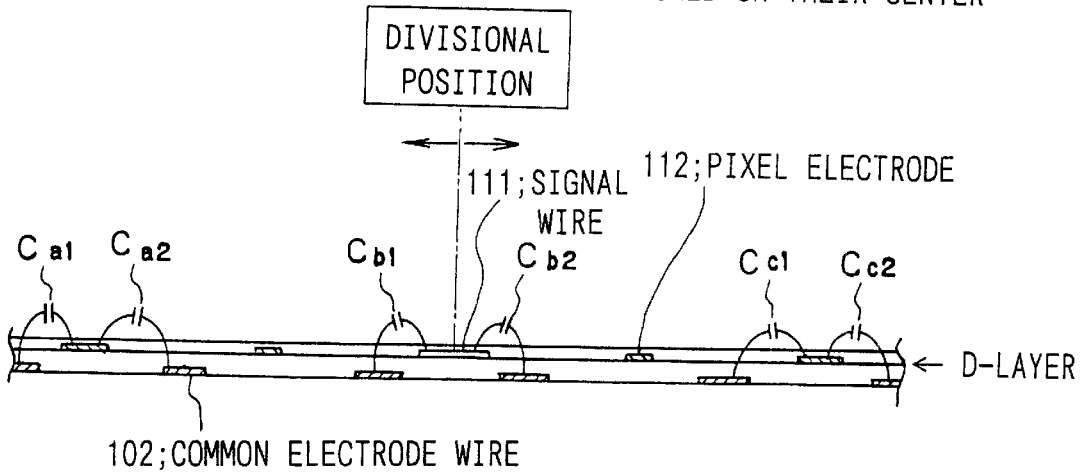
Figure 16:
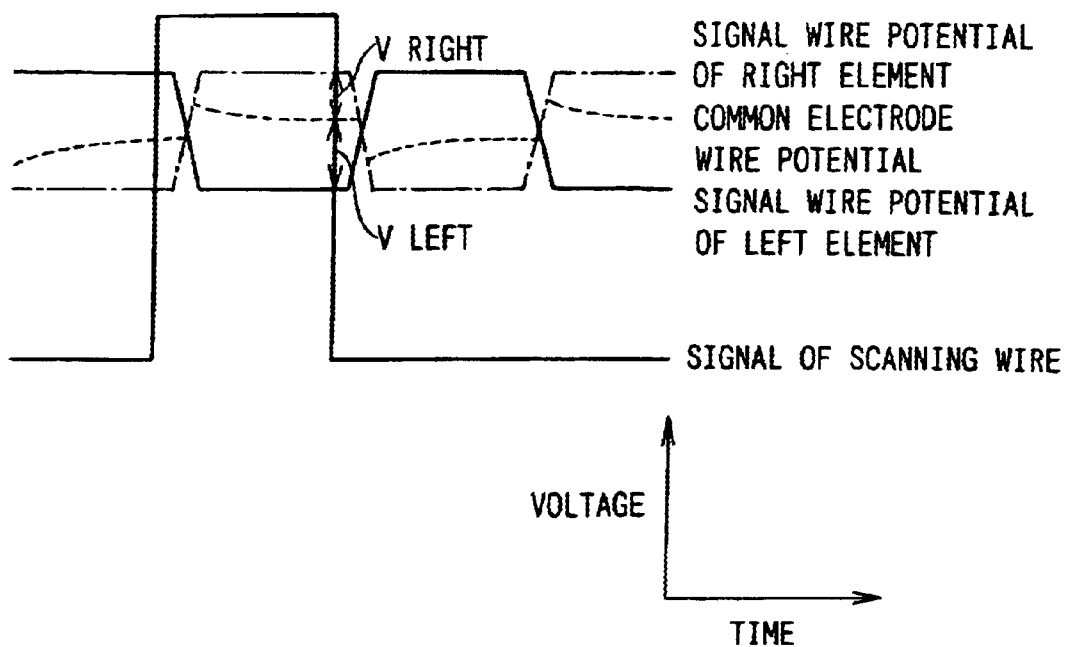
FIG. 16 is a time chart showing change of a signal voltage on a common electrode wire in a conventional liquid crystal display device.
Figure 17:
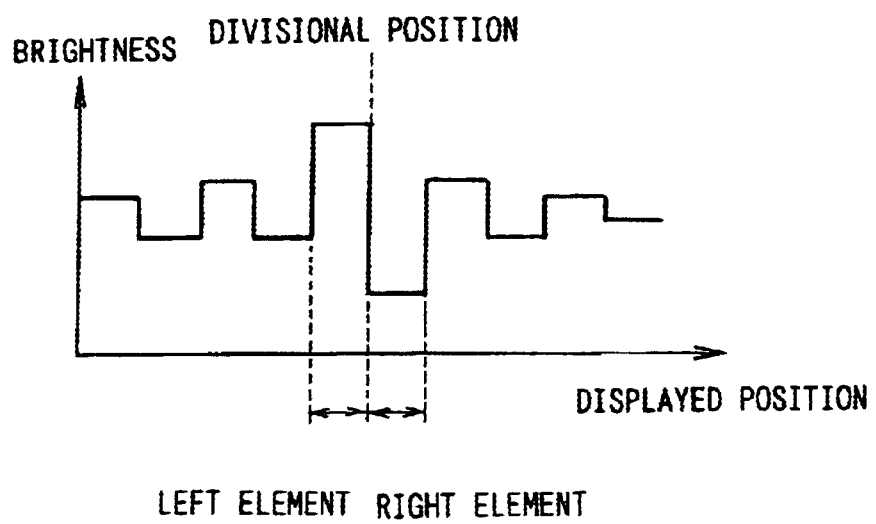
FIG. 17 is a schematic diagram showing the dependency of brightness displayed on a display face on the display position in the case where the electric potential of common electrode wires is deviated in a conventional liquid crystal display panel.

The first example of the liquid crystal display device according to the present invention is different from the conventional liquid crystal display device which as already been explained in reference to FIG. 7 in structure that the first example of the present invention has a branch electrode 401 which is arranged in the same layer as that including the signal wire 111 (cf. FIG. 2). The remainder of the structure is the same with each other. Accordingly, explanation of the same parts is omitted here.

In FIG. 1, the L-shaped branch electrode 401 has its lateral Part extended from the side periphery of the signal wire 111 and positioned on the end side of the comb-shaped branch portion (near the signal wire 111 in parallel thereto) of the common electrode wire 102 formed in a different layer from that including the signal wire. The shape of the branch wire is not limited to this shape, and may be T-shaped or else if it can display the effect of the invention.

A black matrix 201 is formed to have a pattern such that the branch electrode 401 is blinded thereby. How to design the figure and configuration of the branch electrode 401 will be explained in detail below.

In the course of manufacturing this unit, the scanning wire 101 and the common electrode wire 102 are formed in the same layer. Remember that this layer is referred to as "G layer" and that the layer including the signal wire 111 and the pixel electrode 112 is referred to as "D layer".

The action regarding the branch electrode used in the first example of the present invention will be explained below in reference to FIG. 2.

Let's consider the parasitic capacity between the signal wire 111 and the common electrode wire 102 in case of displacing the light spot edge from the divisional position as illustrated in FIG. 2($a$) to shift two of the neighboring D layers in the right and left to each other in the opposite directions while the divisional position is on the center. As can be seen from the illustration of this figure, Cb1 and Cb2 decrease, whereas Cb0 and Cb3 increase, since the branch electrode 401 is a part of the signal wire 111. Thereby, the sum of these parasitic capacities Cbi (i=0 to 3) can be kept constant. This reason can be explained as follows in reference to FIGS. 1 and 2. When the D-layers shifted toward the divisional position, the signal wire 111 and the nearest common electrode wire (comb-shaped branched portion) 102 come apart from each other to decrease the parasitic capacities Cb1 and Cb2 between them. In contrast to this, the portion of the branch electrode 401 disposed parallel to the signal wire 111 and the common electrode wire (comb-shaped portion) 102 approach from each other to increase the parasitic capacities Cb0 and Cb3 between them. Consequently, the sum of these parasitic capacities can be kept constant. The same applies to the sum of ($C_{b0}+C_{b1}$) or ($C_{b2}+C_{b3}$)

By applying the above idea to the branch electrode 401, the figure (and position) of the branch electrode 401 can be determined so as to make the decrease of the parasitic capacities Cb1 and Cb2 between the signal wire 111 and the common electrode wires 102 equal to the increase of the parasitic capacities Cb0 and Cb3 between the branch electrodes 401 and the common electrode wire 102. Accordingly, the parasitic capacity between the signal wire 111 and the common electrode wire 102 can be kept invariable.

Similarly, in the case where the D layers adjacent to each other come away from each other resulting from the displacement of the divisional light spot edges as illustrated in FIG. 2(b), the parasitic capacity between the signal wire 111 and the common electrode wire 102 can be kept invariable, too. This reason can be explained as follows in reference to FIGS. 1 and 2. When the D-layers shift away from each other relative to the divisional position, the signal wire 111 and the common electrode wire (comb-shaped branched portion) 102 approach each other to increase the parasitic capacities Cb1 and Cb2 between them. In contrast to this, the portion of the branch electrode parallel to the signal wire. 111 and the common electrode wire (comb-shaped branched portion) 102 come apart from each other to decrease the parasitic capacities Cb0 and Cb3 between them. Consequently, the sum of these parasitic capacities can be kept invariable.

On the other hand, the aperture area of the black matrix 201 is decreased as the area of the branch electrodes 401 increases to lower the opening ratio of the display panel as shown in FIG. 1. By this reason, the size of the branch electrode 401 is necessary to be set appropriately taking all the properties required for a liquid crystal display device such as the opening ratio and the like into consideration.

In the first exemplary liquid crystal display device of the present invention, the following items are reduced to improve the display quality:

1. emphasized divisional line corresponding to the divisional position
2. vertical faded (faint) stripes
3. lateral crosstalk which have been observed in display a solid image on the screen of the conventional liquid crystal display device The deviation of the scanning wire 101 relative to the center divisional position is negligible as regards the influence on the deviation effect caused by the above deviation of the signal wire from the common electrode wire on the electric potential of the common electrode wire.

EXAMPLE 2

Next, a second example of the present invention will be explained now. FIG. 3 is a plan view showing the essential constitution of a partial wired substrate of the TFT side used in the second example of the present invention; and FIG. 4, a cross sectional view taken along c–c' line of FIG. 3. Referring to FIG. 4, the second example of the present invention is different from the corresponding conventional structure in structure that the second example of the present invention has a branch common electrode 402 attached to (branched from) the common electrode 102 so as to superimpose the branch common electrode 402 on the signal wire 111.

The action regarding the branch common electrode used in the second example of the present invention will be explained below in reference to FIG. 4. When the adjacent G-layers the center of which is on the divisional line come near to each other as illustrated in FIG. 4(a), the overlapped area between the branch common electrode 402 and the signal wire 111 both of which are at the divisional position is reduced because the patterns of the branch common electrode 402 are formed through light-exposing in an overlapping fashion.

In this case, the parasitic capacities Cb1 and Cb2 between the signal wire 111 and the common electrode wires 102 are increased and the parasitic capacity Cb3 between the signal wire 111 and the branch common electrode 402 therebeneath is decreased. The sum of the parasitic capacities Cb1, Cb2 and Cb3 can be kept invariable by determining the shape of the branch electrode 402 so as to make the total increase of the above parasitic capacity equal to the decrease thereof.

When the neighboring G-layers the center of which is on the divisional position come away from each other as illustrated in FIG. 4(b), the overlapped area of the branch common electrode 402 and the signal wire 111, both of which are on the divisional line, increases because the patterns of the branch common electrode 402 are formed through light-exposing in an overlapped fashion with the signal wire 111 of another layer. In this case, the parasitic capacities Cb1 and Cb2 between the signal wire 111 and the common electrode wires 102 are decreased and the parasitic capacity Cb3 between the signal wire 111 and the branch electrode 402 therebeneath is increased. The sum of the parasitic capacities Cb1, Cb2 and Cb3 can be kept invariable by determining the shape of the branch electrode 402 so as to make the total decrease of the above parasitic capacities equal to the increase. of the capacity.

The absolute value of the parasitic capacity between the signal wire 111 and the common electrode wire 102 is increased by an amount corresponding to the additional overlapping area between the branch electrode of the common electrode and the signal wire. This increase of the parasitic capacity causes an increase of each signal wire's impedance to increase delay time constant. Accordingly, it is necessary to set the size of the branch electrode 402 appropriately taking required properties into consideration.

In the second exemplary liquid crystal display device of the present invention, the following items are reduced:

1. emphasized separation line corresponding to the divisional position
2. vertical faded stripes
3. lateral crosstalk observed in display a solid image on the screen of the conventional liquid crystal display device to improve the display quality similarly to the case of the first example.

This is based on the reason that the deviation effect, generated by the signal wire, on the common electrode wire in terms of an electric potential caused by the asymmetry (or deviation) of the parasitic capacities between the signal wire and the common elect rode wires is reduced by the compensating capacity provided by the branch electrodes.

Of course, the structural combination of the first and second examples may be possible for improving the display quality displayed on the screen of a liquid crystal display device.

The above described image improving technology of the present invention is applicable not only to the above described liquid crystal display device employing the IPS mode but also to such a liquid crystal display device as having a common electrode formed on both substrates, i.e., TFT side and its opposite side in which the common electrode of the TFT side is formed in a different layer from that including the signal wire.

The meritorious effect of the invention are summarized as follows.

As explained above, the following items are reduced or inhibited 1. emphasized separation line corresponding to the divisional position
2. vertical faded stripes
3. lateral crosstalk.

Namely, those defects which have been observed in display a solid image on the screen of the conventional active matrix liquid crystal display device having a display part produced through divisional light-exposing and which is caused by the deviation (displacement) of the divisionally exposed light spots can be reduced or inhibited to improve the display quality according to the present invention.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. An active matrix liquid crystal display device comprising signal wires formed in one layer and common electrodes formed in another layer on a display face by patterning those layers through divisional-light exposing, wherein capacitance patterns are provided on each said signal wire and/or said common electrode such that the sum of all parasitic capacitances between each said signal wire and a common electrode wire nearest therefrom for said active matrix liquid crystal display device is constant irrespective of the position of each signal wire whether or not each said signal wire is at the divisional position, each of said capacitance patterns being a branch electrode provided on said signal wire, projected laterally from the longitudinal periphery of said signal wire, extended beyond said common electrode nearest from said signal wire, and then bent to be extended by a predetermined distance parallel to said signal wire.

2. An active matrix liquid crystal display device, in which a liquid crystal is driven by an electric field component parallel to a substrate surface of a display panel, and which has one layer comprising scanning wires and common electrodes as well as another layer comprising signal wires and pixel electrodes on a substrate of said display panel, said both layers being patterned through divisional light-exposing, wherein capacitance patterns are provided on each said signal wire and/or said common electrode such that the sum of parasitic capacitances between each said signal wire and a common electrode wire nearest therefrom is constant irrespective of whether or not each said signal wire is at the divisional position, each of said capacitance patterns being a branch electrode provided on said signal wire, projected laterally from the longitudinal periphery of said signal wire, extended beyond said common electrode nearest from said signal wire, and then bent to be extended by a predetermined distance parallel to said signal wire.

3. An active matrix liquid crystal display device comprising signal wires formed in one layer and common electrodes formed in another layer on a display face by patterning those layers through divisional-light exposing, wherein capacitance patterns are provided on each said signal wire and/or said common electrode such that the sum of all parasitic capacitances between each said signal wire and a common electrode wire nearest therefrom for said active matrix liquid crystal display device is constant irrespective of the position of each signal wire whether or not each said signal wire is at the divisional position, and wherein each of said capacitance patterns is a branch electrode provided on said, common electrode, projected therefrom so as to be superimposed with said signal wire when viewed from the top and extended by a predetermined distance along the longitudinal direction of said signal wire.

4. An active matrix liquid crystal display device, in which a liquid crystal is driven by an electric field component parallel to a substrate surface of a display panel, and which has one layer comprising scanning wires and common electrodes as well as another layer comprising signal wires and pixel electrodes on a substrate of said display panel, said both layers being patterned through divisional light-exposing, wherein capacitance patterns are provided on each said signal wire and/or said common electrode such that the sum of parasitic capacitances between each said signal wire and a common electrode wire nearest therefrom is constant irrespective of whether or not each said signal wire is at the divisional position, and wherein each of said capacitance patterns is a branch electrode provided on said common electrode, projected therefrom so as to be superimposed with said signal wire when viewed from the top and extended by a predetermined distance along the longitudinal direction of said signal wire.

5. An active matrix display device, in which a liquid crystal is driven by an electric field having a component parallel to a substrate surface of a display panel, on one substrate of which one layer comprising scanning wires and comb-shaped common electrodes as well as another layer comprising signal wires perpendicular to said scanning wires and pixel electrodes, said two layers being patterned through divisional light-exposing, at least said signal wires being periodically on the divisional position, the improvement comprising:

(a) that branch electrodes, each of which is projected from one or both longitudinal peripheries of said signal wires, extended beyond a comb-shaped portion of said common electrode nearest therefrom, and then bent to extend a portion by a predetermined distance parallel to said signal wire, (b) that in case where said signal wire on the divisional position is deviated upon said light-exposing, parasitic capacity on the divisional position is made substantially equal to parasitic capacity at positions other than the divisional position by decreasing/increasing parasitic capacity at the divisional position between the bent and extended portion of said branch electrode and said nearest comb-shaped portion of the common electrode according to increasing/decreasing said parasitic capacity at the divisional position between said branch electrode and said comb-shaped portion of the common electrode to make the sum of the parasitic capacities invariable.

6. An active matrix display device, in which a liquid crystal is driven by an electric field having a component parallel to a substrate surface of a display panel, and which has one layer comprising scanning wires and comb-shaped common electrodes as well as another layer comprising signal wires perpendicular to said scanning wires and pixel electrodes on one substrate of said display panel, said two layers being patterned through divisional light-exposing by assuming divisional positions at least on said signal wires, the improvement comprising:
(a) that auxiliary electrode patterns are arranged, each of which is projected with a predetermined width from said common electrode to be superimposed with said signal wire when viewed from the top and extended by a predetermined distance along the longitudinal direction of said signal wire,
(b) that in case where said signal wire on the divisional position is deviated upon said light-exposing, parasitic capacity at the divisional position is made substantially equal to parasitic capacity at positions other than the divisional position by decrease/increase of parasitic capacity at the divisional position between said signal wire and said auxiliary electrode caused by decreasing/increasing the overlapped area of the same signal wire and the same auxiliary electrode according to increasing/decreasing parasitic capacity at the divisional position of between said signal wire and the comb-shaped portion of said common electrode to make sum of said parasitic capacities invariable.

* * * * *